(12) United States Patent
Iancu et al.

(10) Patent No.: US 7,058,117 B1
(45) Date of Patent: Jun. 6, 2006

(54) RAKE RECEIVER WITH MULTI-PATH INTERFERENCE ACCOMMODATION

(75) Inventors: Daniel Iancu, Pleasantville, NY (US); John Glossner, Carmel, NY (US); Mayan Moudgill, White Plains, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 0 days.

(21) Appl. No.: 10/530,439

(22) PCT Filed: Jul. 26, 2004

(86) PCT No.: PCT/US2004/023665

§ 371 (c)(1),
(2), (4) Date: Apr. 7, 2005

(87) PCT Pub. No.: WO2005/013626

PCT Pub. Date: Feb. 10, 2005

(51) Int. Cl.
*H04B 1/707* (2006.01)

(52) U.S. Cl. .................. 375/148; 375/340; 375/346

(58) Field of Classification Search ........ 375/142–144, 375/148–150, 152, 340, 346; 370/320, 335, 370/342, 441
See application file for complete search history.

(56) References Cited

U.S. PATENT DOCUMENTS

| | | | |
|---|---|---|---|
| 6,078,611 A | 6/2000 | La Rosa et al. | |
| 6,101,176 A | 8/2000 | Honkasalo et al. | |
| 6,198,765 B1 | 3/2001 | Cahn et al. | |
| 6,269,075 B1 | 7/2001 | Tran | |
| 6,314,131 B1 | 11/2001 | Roe et al. | |
| 6,345,078 B1 | 2/2002 | Basso | |
| 6,370,182 B1 | 4/2002 | Bierly | |
| 6,370,183 B1 | 4/2002 | Newson et al. | |
| 6,373,888 B1 | 4/2002 | Lindoff | |
| 6,404,759 B1 | 6/2002 | Shoji | |
| 2001/0033614 A1 | 10/2001 | Hudson | |
| 2002/0122508 A1 | 9/2002 | Jard et al. | |

(Continued)

OTHER PUBLICATIONS

Fock, Gunnar et al., "Channel Tracking for Rake Receivers in Closely Spaced Multipath Environments," *IEEE Journal on Selected Areas in Communications*, 19:12, Dec. 2001.

*Primary Examiner*—Don N. Vo
(74) *Attorney, Agent, or Firm*—Barnes & Thornburg LLP

(57) ABSTRACT

A method of extracting data from a received signal including multi-path interference in a rake receiver. The method includes sampling and filtering the received signal; estimating a time delay $\tau_l$ between paths for the filtered samples $\psi(\tau)$; and estimating channel complex coefficient $c_l$ for the filtered samples $\psi(\tau)$. Transmitted data $x(\tau_l)$ is extracted from the filtered samples $\psi(\tau)$ for each path l by solutions of simultaneous equations of the following filtered samples $\psi(\tau)$ equation $$\psi(\tau) R_{ff}^{-1}(\tau_k - \hat{\tau}_0) \Lambda_{ss}^H(\hat{\tau}_k) = \sum_{l=0}^{N_p+1} c_i(\tau_l) \times (\tau_l) \Lambda_{ss}(\tau_l) R_{ff}(\tau_l - \hat{\tau}_0) R_{ff}^{-1}(\tau_k - \hat{\tau}_0) \Lambda_{ss}^H(\hat{\tau}_k) + \bar{n}(\tau)$$

wherein k is a particular path, $N_p$ is the number of visible paths, $R_{ff}(\tau_l-\tau_o)$ is a double convolution matrix of the filtering process and $R_{ff}^{-1}(\tau_k-\tau_o)$ is the pseudo inverse, $\Lambda_{ss}(\tau_l)$ is the product of spreading and scrambling matrices and $\Lambda_{ss}^H(\tau_k)$ is the inverse, and $\bar{n}(\tau)$ is noise.

6 Claims, 1 Drawing Sheet

U.S. PATENT DOCUMENTS

| | | |
|---|---|---|
| 2003/0036359 A1 | 2/2003 | Dent et al. |
| 2004/0017846 A1* | 1/2004 | Fernandez-Corbaton et al. ............ 375/152 |
| 2004/0120300 A1* | 6/2004 | Saquib .................. 370/342 |
| 2004/0151236 A1 | 8/2004 | Lilleberg et al. |
| 2005/0111528 A1* | 5/2005 | Fulgham et al. ............ 375/148 |
| 2005/0163198 A1* | 7/2005 | Wei et al. .................... 375/148 |
| 2006/0013289 A1* | 1/2006 | Hwang .................. 375/148 |

* cited by examiner

RAKE RECEIVER WITH MULTI-PATH INTERFERENCE ACCOMMODATION

BACKGROUND AND SUMMARY

The present disclosure is directed to multi-path cancellation in wireless communication and more specifically to accommodating for the multi-path interference.

Multi-path interference is an undesired phenomenon characteristic in the wireless communication field. In certain cases, it can produce serious communication channel impairment. It is characteristic to dense urban areas and confined areas such as shopping malls. One form of multi-path interference cancellation (MPIC) is suggested in "Channel Tracking for Rake Receivers in Closely Spaced Multipath Environments," Fock et al., IEEE Journal on Selected Areas in Communications, vol. 19, no. 12, pp. 2420–31, December 2001. It uses fading coefficients and relative delays to compute a compensation term that allows cancellation of the effect of other paths on the timing error.

The present method extracts data from a received signal including multi-path interference in a rake receiver. The method includes sampling and filtering the received signal, estimating a time delay $\tau_l$ between paths for the filtered samples $\psi(\tau)$, and estimating channel complex coefficient $c_l$ for the filtered samples $\psi(\tau)$. Transmitted data $x(\tau_l)$ is extracted from the filtered samples $\psi(\tau)$ for each path l by solutions of simultaneous equations of the following filtered samples $\psi(\tau)$ equation:

$$\psi(\tau)R_{ff}^{-1}(\tau_k - \hat{\tau}_0)\Lambda_{ss}^H(\hat{\tau}_k) = $$
$$\sum_{l=0}^{N_p-1} c_l(\tau_l)x(\tau_l)\Lambda_{ss}(\tau_l)R_{ff}(\tau_l - \hat{\tau}_0)R_{ff}^{-1}(\tau_k - \hat{\tau}_0)\Lambda_{ss}^H(\hat{\tau}_k) + \vec{n}(\tau)$$

wherein k is a particular path, $N_p$ is the number of visible paths, $R_{ff}(\tau_l - \tau_o)$ is a double convolution matrix of the filtering process and $R_{ff}^{-1}(\tau_k - \tau_o)$ is the pseudo inverse, $\Lambda_{ss}(\tau_l)$ is the product of spreading and scrambling matrices and $\Lambda_{ss}^H(\tau_k)$ is the inverse, and $\vec{n}(\tau)$ is noise.

The method is selectively performed for estimated time delay $\tau_l$ of a duration of one chip or less of the receiver. If the time delay is greater than one chip, no extraction is necessary. The filtered samples $\psi(\tau)$ equations without the noises $\vec{n}(\tau)$ are solved. The number of solutions may be less or equal to the number of over-samples per chip of the receiver. The solutions of the simultaneous equations may be stored in the receiver and the method performed in software.

These and other aspects of the present invention will become apparent from the following detailed description, when considered in conjunction with accompanying drawings.

DETAILED DESCRIPTION

Figure 1:
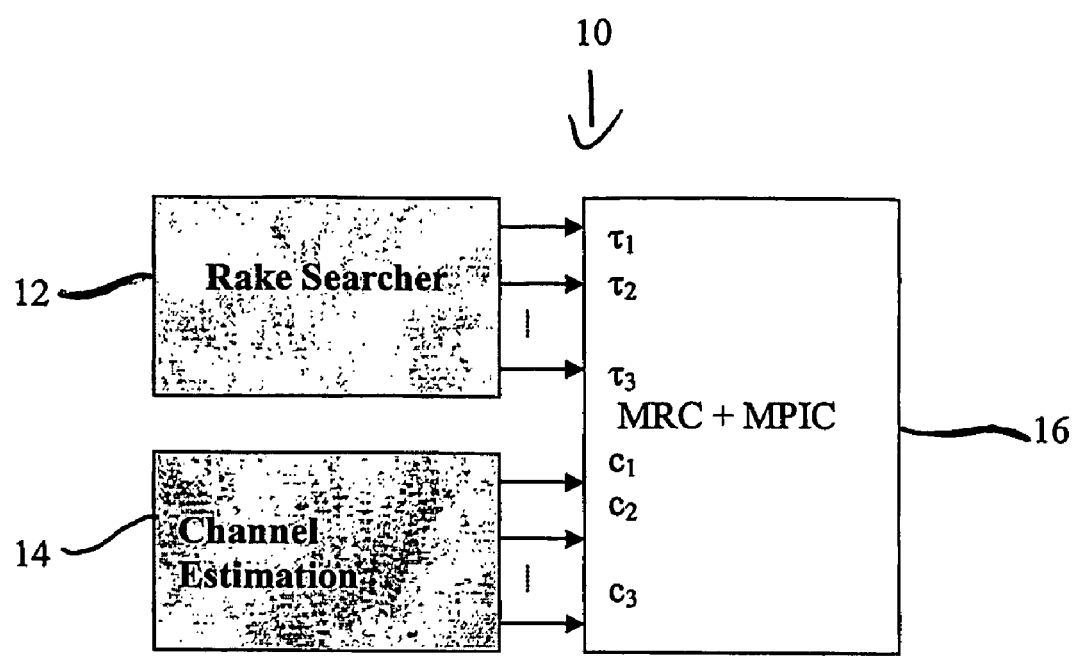
FIG. 1 is a block diagram of a rake receiver.

FIG. 1 illustrates a generic representation of a rake receiver. The elements are well known and not described herein in detail. Only those elements or functional portions which are used in the present method are illustrated. The rake receiver 10 includes a rake searcher 12 and a channel estimator 14 providing path delay estimations $\tau_1, \tau_2 \ldots \tau_3$ and estimates to the channel coefficients $c_1, C_2 \ldots c_3$ to the main processing portion 16. The main processing portion 16 includes a multi-path interference cancellation (MPIC) portion and a Maximum Ratio Combiner (MRC) portion. Depending upon the structure, these may be hardware or software routines. As described herein, the MPIC is performed in software and achieves multi-path interference cancellation or accommodation by representing the received filtered signal with a linear equation and extracting the transmitted data from the filtered sample for each path by a solution of simultaneous equations of the filtered sample equation.

The present disclosure does not depend upon what method is used to estimate the path delays nor the channel coefficients. Any method of the prior art may be used, as well as any method that may be developed in the future.

The linear equation to be solved is a follows:

$$\psi(\tau)R_{ff}^{-1}(\tau_k - \hat{\tau}_0)\Lambda_{ss}^H(\hat{\tau}_k) = \sum_{l=0}^{N_p-1} c_l(\tau_l)x(\tau_l)\Lambda_{ss}(\tau_l)R_{ff}(\tau_l - \hat{\tau}_0)R_{ff}^{-1}(\tau_k - \hat{\tau}_0)\Lambda_{ss}^H(\hat{\tau}_k) + \quad (1$$
$$\vec{n}(\tau)R_{ff}^{-1}(\tau_k - \hat{\tau}_0)\Lambda_{ss}^H(\hat{\tau}_k)$$
$$= x(\hat{\tau}_k)c_k(\tau_k)\Lambda_{ss}(\tau_k)\Lambda_{ss}^H(\hat{\tau}_k) +$$
$$\sum_{\substack{l=0 \\ l \neq k}}^{N_p-1} c_l(\tau_l)x(\tau_l)\Lambda_{ss}(\tau_l)R_{ff}(\tau_l - \hat{\tau}_0)R_{ff}^{-1}(\tau_k - \hat{\tau}_0)\Lambda_{ss}^H(\hat{\tau}_k) +$$
$$\vec{n}(\tau)$$

where: estimating channel complex coefficients $c_l(\tau_l)$ is assumed constant for the duration of a data block;

$\psi(\tau)$ is filtered samples;

$\tau_l$ is the time delay between paths for the filtered samples $\psi(\tau)$;

$x(\tau_l)$ is transmitted data to be extracted;

$R_{ff}(\tau_l - \tau_o)$ is a double convolution matrix of the filtering process, and $R_{ff}^{-1}(\tau_k - \tau_o)$ is the pseudo inverse;

k is a particular path;

$N_p$ is the number of visible paths;

$\Lambda_{ss}(\tau_l)$ is the product of spreading s and scrambling S matrices and $\Lambda_{ss}^H(\tau_k)$ is the inverse; and $\bar{n}(\tau)$ is noise and $\bar{n}(\tau)R_{ff}^{-1}(\tau 0-\tau_o)\Lambda_{ss}^H(\tau_o)=\bar{n}(\tau)$ The last sum in the right hand side of equation (1):

$$\sum_{l=1}^{N_p-1} c_l(\tau_l)x(\tau_l)\Lambda_{ss}(\tau_l)R_{ff}(\tau_l-\hat{\tau}_0)R_{ff}^{-1}(\tau_k-\hat{\tau}_0)\Lambda_{ss}^H(\hat{\tau}_k) \quad (2)$$

is the multi-path interference.

If the path delay is larger than a chip, the last sum in equation (1) is negligible due to the correlation properties of the scrambling matrix S. Equation (1) becomes $$\psi(\tau)R_{ff}^{-1}(\tau_k-\tau_o)\Lambda_{ss}^H(\tau_k)=X(\tau_k)C_k(\tau_k)\Lambda_{ss}(\tau_k)\Lambda_{ss}^H(\tau_k)$$

wherein the solution for transmitted data $x(\tau_l)$ is $$x(\hat{\tau}_k) = \frac{\psi(\tau)R_{ff}^{-1}(\tau_k-\hat{\tau}_0)\Lambda_{ss}^H(\hat{\tau}_0)\hat{c}_k^*(\hat{\tau}_k)}{\alpha M} \quad (4)$$

wherein where $\alpha=c_o(\tau_o)c_o(\tau_o)$ is constant for the duration of a data block, and $M=\Lambda_{ss}(\tau_k)\Lambda_{ss}^H(\tau_k)$.

If equation (4) is used for path delays larger than a chip, it represents an equalizer. Thus, for each path there will be a simple solution. All $X_k$ are summed up in a certain ratios using coefficients $\beta_l$ in the MRC. If the entries for $R_{ff}^{-1}(\tau_k-\tau_o)\Lambda_{ss}^H(\tau_o)C_k(\tau_k)$ are stored in the memory, equation (4) is executed in software.

For path delays less than a chip, the last term is not negligible; therefore, a better symbol estimate can be obtained by extracting the data from the received signal, including the multi-path interference term, by solving all the simultaneous equations for all of the paths using equation (1).

The final estimate is the sum of the estimates using coefficients $\beta_l$:

$$\hat{x} = \sum_{l=0}^{N_p-1} \hat{\beta}_l x(\tau_l) \quad (5)$$

The following is an example for two path delays less than a chip apart. In order to simplify the writing, the following notation will be used:

$R_{ff}(\tau_l-\tau_o)=R(l)$, $R_{ff}^{-1}(\tau_k-\tau_o)=R(k),\Lambda(\tau_l)=\Lambda(l),\Lambda(\tau_l)=\Lambda(l)$, $c_l(\tau_l)=c(l)$ and $x(\tau_k)=x(k)$. Equation (1) for each of the path delays becomes:

$$\begin{cases} \psi(\tau)R^{-1}(0)\Lambda^H(0) = c_0x(0)\Lambda(0)R(0)R^{-1}(0)\Lambda^H(0) + c_1x(1)\Lambda(1)R(1)R^{-1}(0)\Lambda^H(0) + n_1 \\ \psi(\tau)R^{-1}(1)\Lambda^H(1) = c_0x(0)\Lambda(0)R(0)R^{-1}(1)\Lambda^H(1) + c_1x(1)\Lambda(1)R(1)R^{-1}(1)\Lambda^H(1) + n_2 \end{cases} \quad (6)$$

Ignoring the noise n, the two simultaneous equations (6) are solved with the following solutions:

$$x(0) = \frac{1}{c_0}\Psi(\tau)\frac{R^{-1}(0)\Lambda^H(0) - R^{-1}(1)\Lambda^H(1)\Lambda(1)R(1)R^{-1}(0)\Lambda^H(0)}{I - \Lambda(0)R(0)R^{-1}(1)\Lambda^H(1)\Lambda(1)R(1)R^{-1}(0)\Lambda^H(0)} \quad (7)$$

$$x(1) = \frac{1}{c_1}\Psi(\tau)$$

$$\frac{I - \Lambda(0)R(0)R^{-1}(1)\Lambda^H(1)[R^{-1}(1)\Lambda^H(1)]^{-1}R^{-1}(0)\Lambda^H(0)}{I - \Lambda(0)R(0)R^{-1}(1)\Lambda^H(1)\Lambda(1)R(1)R^{-1}(0)\Lambda^H(0)}$$

The equations (7) can be simplified as $$x(0) = \frac{1}{c_0}\Psi(\tau)H(0) \text{ and } x(1) = \frac{1}{c_1}\Psi(\tau)H(1)$$

and the matrixes H pre-calculated and stored in the memory.

Theoretically, the number of visible paths will be less than or equal to the number of over-samples $N_{ovs}$. Therefore, the maximum number of $R_{ff}^{-1}(\tau_k-\tau_o)$ matrixes will be $N_{ovs}$, where the values $\tau_{l-o}=\Delta\tau$ are equal to the sampling rate. This may depend on the communication format and memory capacity.

Although this application has been designed for 3G WCDMA, it is applicable for other types of networks or communication protocols.

Although the present disclosure has been described and illustrated in detail, it is to be clearly understood that this is done by way of illustration and example only and is not to be taken by way of limitation. The scope of the present invention is to be limited only by the terms of the appended claims.

What is claimed:

1. A method of extracting data from a received signal including multi-path interference in a rake receiver, comprising:
    sampling and filtering the received signal;
    estimating a time delay $\tau_l$ between paths for the filtered samples $\psi(\tau)$;
    estimating channel complex coefficient $c_l$ for the filtered samples $\psi(\tau)$;
    extracting transmitted data $x(\tau_l)$ from the filtered samples $\psi(\tau)$ for each path l by solutions of simultaneous equations of the following filtered samples $\psi(\tau)$ equation $$\psi(\tau)R_{ff}^{-1}(\tau_k-\hat{\tau}_0)\Lambda_{ss}^H(\hat{\tau}_k) =$$

-continued $$\sum_{k=0}^{N_p-1} c_l(\tau_l) x(\tau_l) \Lambda_{ss}(\tau_l) R_{ff}(\tau_l - \hat{\tau}_0) R_{ff}^{-1}(\tau_k - \hat{\tau}_0) \Lambda_{ss}^H(\hat{\tau}_k) + \tilde{n}(\tau)$$

wherein k is a particular path, $N_p$ the number of visible paths, $R_{ff}(\tau_l - \tau_o)$ is a double convolution matrix of the filtering process and $R_{ff}^{-1}(\tau_o - \tau_o)$ is the pseudo inverse, $\Lambda_{ss}(\tau_l)$ is the product of spreading and scrambling matrices and $\Lambda_{ss}^H(\tau_o - \tau_o)$ is the inverse, and $\tilde{n}(\tau)$ is noise.

2. The method according to claim 1, wherein the method is selectively performed for estimated time delay $\tau_l$ of a duration of one chip or less of the receiver.

3. The method according to claim 1, wherein the filtered samples $\psi(\tau)$ equations without the noises $\tilde{n}(\tau)$ are solved.

4. The method according to claim 1, wherein the number of solutions is less than or equal to the number of over-samples per chip of the receiver.

5. The method according to claim 1, wherein the solutions of the simultaneous equations are stored in the receiver and the method is performed in software.

6. The method according to claim 5, wherein the number of stored solutions is less than or equal to the number of over-samples per chip of the receiver.

* * * * *